(12) United States Patent
Kertesz et al.

(10) Patent No.: US 7,971,911 B2
(45) Date of Patent: Jul. 5, 2011

(54) PLUG PART OF A PLUG-TYPE CONNECTION ARRANGEMENT AND PLUG-TYPE CONNECTION ARRANGEMENT

(75) Inventors: Janos Kertesz, Hofheim (DE); Gerhard Wachter, Buedingen (DE)

(73) Assignee: NORMA Germany GmbH, Maintal (DE)

( * ) Notice: Subject to any disclaimer, the term of this patent is extended or adjusted under 35 U.S.C. 154(b) by 193 days.

(21) Appl. No.: 12/206,462

(22) Filed: Sep. 8, 2008

(65) Prior Publication Data

US 2009/0072531 A1 Mar. 19, 2009

(30) Foreign Application Priority Data

Sep. 19, 2007 (DE) .................. 10 2007 045 022

(51) Int. Cl.
*F16L 33/00* (2006.01)
(52) U.S. Cl. ................. 285/305; 285/424; 285/257
(58) Field of Classification Search .................. 285/374, 285/424, 256, 921, 305, 257
See application file for complete search history.

(56) References Cited

U.S. PATENT DOCUMENTS

| | | | | |
|---|---|---|---|---|
| 454,649 A * | 6/1891 | Hallas | ............ | 285/424 |
| 1,296,016 A * | 3/1919 | Smith | ............ | 285/374 |
| 1,324,602 A * | 12/1919 | Lorenz | ............ | 285/305 |
| 1,429,822 A * | 9/1922 | Acer | ............ | 285/305 |
| 2,432,598 A * | 12/1947 | Weatherhead, Jr. | ............ | 285/256 |
| 2,650,112 A * | 8/1953 | Kinkead | ............ | 285/424 |
| 2,782,060 A * | 2/1957 | Appleton | ............ | 285/256 |
| 2,851,288 A * | 9/1958 | Kinkead | ............ | 285/424 |
| 2,959,196 A * | 11/1960 | Truesdell et al. | ............ | 285/424 |
| 3,065,002 A * | 11/1962 | Waalkes et al. | ............ | 285/424 |
| 3,066,959 A * | 12/1962 | White | ............ | 285/424 |
| 3,170,544 A * | 2/1965 | Kinkead et al. | ............ | 285/424 |
| 3,233,927 A * | 2/1966 | Dewhirst | ............ | 285/424 |
| 3,272,537 A * | 9/1966 | Bellatorre et al. | ............ | 285/424 |
| 3,964,772 A * | 6/1976 | Cox, Jr. | ............ | 285/424 |
| 4,335,753 A * | 6/1982 | Frye | ............ | 285/256 |
| 5,295,718 A * | 3/1994 | Bartholomew | ............ | 285/256 |
| 5,582,435 A * | 12/1996 | Goto et al. | ............ | 285/256 |
| 5,855,399 A * | 1/1999 | Profunser | ............ | 285/305 |
| 5,857,718 A * | 1/1999 | Kleinschmidt | ............ | 285/305 |
| 6,131,959 A * | 10/2000 | Profunser | ............ | 285/256 |
| 6,308,993 B1 * | 10/2001 | Phillips | ............ | 285/256 |
| 6,431,609 B1 * | 8/2002 | Andersson | ............ | 285/424 |
| 7,347,224 B2 * | 3/2008 | Nohara et al. | ............ | 285/424 |
| 7,562,910 B2 * | 7/2009 | Kertesz et al. | ............ | 285/256 |

FOREIGN PATENT DOCUMENTS

| | | |
|---|---|---|
| DE | 31 23 606 | 6/1981 |
| DE | 196 54 364 | 12/1996 |
| DE | 197 43 825 A1 | 3/1997 |
| DE | 10 2006 047 882 | 2/2007 |
| EP | 559505 A1 * | 9/1993 |

* cited by examiner

*Primary Examiner* — David E Bochna
(74) *Attorney, Agent, or Firm* — Greenblum & Bernstein, P.L.C.

(57) ABSTRACT

Plug part of a plug-type connection arrangement for connecting two fluid lines and plug-type connection arrangement including the plug part. The plug part includes at least one two-layer area, the two layers of the two-layer area including a metallic material. At least a portion of the plug part is structured and arranged to be fed into a coupling part of the plug-type connection arrangement.

33 Claims, 4 Drawing Sheets

PLUG PART OF A PLUG-TYPE CONNECTION ARRANGEMENT AND PLUG-TYPE CONNECTION ARRANGEMENT

CROSS-REFERENCE TO RELATED APPLICATIONS

The present application claims priority under 35 U.S.C. §119 of German Patent Application No. 10 2007 045 022.4, filed on Sep. 19, 2007, the disclosure of which is expressly incorporated by reference herein in its entirety.

BACKGROUND OF THE INVENTION

1. Field of the Invention

The invention relates to a plug part of a plug-type connection arrangement for connecting two fluid lines. The plug part can be fed into a coupling part of the plug-type connection arrangement. Furthermore, the invention relates to a plug-type connection arrangement with a plug of this type.

2. Discussion of Background Information

An arrangement of this type is described, for example, in DE 10 2006 047 882 A1. The described plug-type connection arrangement includes a plug part and a coupling part for connecting hoses or pipes. A pipe is provided with a coupling part embodied as a metal sleeve part, while a plug part injection-molded from a synthetic material is inserted into the coupling part. The plug part, as well as the coupling part, has an annular groove made on the outside. To lock plug part and coupling part together, a resilient connecting ring, which has flange areas angled by 90° at both of its ends, is pushed on between the plug part and coupling part in the region of the joint seam. The flange regions of the connecting ring engage in the annular grooves and the plug part and coupling part thereby lock with one another.

Even though plug-type connection arrangements for fluid lines are already known per se, they still exhibit disadvantages. In particular, deficits still exist regarding ease of assembly, possibility of disengaging the connection, cost-effective design, great durability, great seal tightness, small structure and cost-effective production.

SUMMARY OF THE INVENTION

Embodiments of the present invention provide a particularly durable and loadable plug-type connection arrangement.

According to embodiments of the invention, a plug part of the type mentioned at the outset includes at least one two-layer area in which the two layers have a metallic material. Metallic materials in particular have a usually high strength and high long-term durability with a relatively low weight. It is noted that, because production cost would become too high, the use of metallic materials has hitherto been considered to be impractical particularly for plug parts of plug-type connection arrangements. A production by material machining from a solid block, which is conceivable per se, is too expensive particularly in production for the present purpose of use. Thus, while a two-layered embodiment would have hitherto seemed to be too complex due to the jointing technologies necessary in that case, the inventors have surprisingly determined that it is possible when using suitable techniques to produce a cost-effective and durable plug part using metallic materials. Moreover, due to the two-layered embodiment, a particularly high strength is possible in the corresponding parts, while at the same time, the respective material layers can be embodied to be relatively thin so that the total weight of the plug part remains at a low level.

If at least one of the layers is made of a metallic material, the strength of the plug part can be increased again. Since essentially no other materials are present in addition to the metallic material in the corresponding layer, the thickness of the plug part can also be reduced again. The term "essentially no other material" should be understood in particular to mean that a protective varnish or a solder material application and the like is not ruled out.

The metallic material is preferably a sheet metal. An at least essentially closed surface can be realized thereby, so that the plug part has a high stability, yet at the same time a high seal tightness.

In this context it has shown to be advantageous if the plug part is embodied or formed at least in part in a deep-drawn manner. With a production method of this type, it is particularly easily possible to embody a cylindrical surface closed along a circumference and without any joint seam. Deep-drawing methods have also otherwise proven to be cost-effective production methods.

It is advantageous if the two layers of the two-layer area are connected to one another in one piece. This one-piece embodiment likewise promotes a particularly high strength of the plug part. In this context it has been shown that it is generally sufficient for the two layers of the plug part to be connected to one another in one piece on only one side. Through an embodiment of this type, a usually adequate strength and tightness can already be obtained. If particularly high strength requirements are necessary, it is also possible to provide a one-piece connection in two or more regions.

It is particularly advantageous if the plug part comprises essentially completely a metallic material. Thus, jointing techniques between different materials (e.g., adhesives, positive connection techniques, non-positive connection techniques, etc.) which are correspondingly complex in production, can be at least largely avoided. The durability of the plug part can also be increased in that a detachment of different material layers from one another can be avoided. Moreover, recycling can also be easier to carry out.

It is possible for the plug part to have an extended insert area for insertion into the coupling part. In particular through an embodiment of the invention it is possible to embody or form this insert area to be longer than is possible with previous plug parts. For example, with an internal diameter of 38 mm, lengths of 30 mm and more can be utilized in accordance with an embodiment of the invention. The ratio of the length of the insert area to the diameter can thus be greater than equal to 0.75, 0.8, 0.85, 0.9, 0.95, 1.0, 1.1, 1.2, 1.3, 1.4, 1.5 and/or 1.75. Thus, a particularly tight bending-resistant plug connection can be realized. Moreover, since the wall of the plug part can be embodied or formed to be very thin-walled, no excessive flow resistance is induced in the connection area through a long embodiment of this type, either.

Furthermore, it can be advantageous if the plug part has a tapering feed region in a front area for feeding into the coupling part. The feed of the plug part into the opening of the coupling part during assembly can thus be substantially simplified. Since only a certain short area is affected, the induced fluid flow resistances are still kept within narrow limits. The tapering can be realized for example by a folding of the insert part in the area of the face side of the plug part radially inwards.

The plug part preferably has an annular groove for engaging a locking element that serves the locking connection of the plug part and the coupling part. Through a locking element of this type it is possible to embody or form the plug-type connection arrangement through a simple guiding of plug part and coupling part towards one another. A particularly simple and rapid assembly of the finished components is thereby possible in a particularly simple manner. The annular groove can be used thereby so that a locking component engages therein and a positive locking connection between plug part and coupling part can thus be embodied.

It is particularly advantageous if the plug part has an inclined contact surface that leads to the annular groove. In this embodiment, the locking element can be expanded by the movement towards one another of the plug part and coupling part, before it snaps into the annular groove.

It can be advantageous if radial projections are provided that at least in some areas have a greater external radius than corresponds to the largest external radius of the inclined contact surface. A collar-like ring or one or more sections of a ring of this type can also be used as a radial projection of this type. The radial projections can prevent the locking component from getting behind the annular groove (or any other attachment area of the plug part), thus impeding the embodiment of the locking connection.

It is possible that the two layers of the two-layer area can be spaced apart from one another at least in some areas, in particular in the area of an insert region for inserting the plug part into the coupling part and/or in the area of the annular groove of the plug part. A particularly high mechanical strength can be realized through an embodiment spaced apart in this manner.

It is likewise possible for the two layers to be in contact with one another at least in some areas, in particular in the area of an insert area for inserting the plug part into the coupling part and/or in the area of the annular groove of the plug part. With an embodiment of this type it is in particular possible to reduce the fluid flow losses that may inevitably occur in the transition region of the plug-type connection arrangement, since the internal diameter can be selected to be larger in relation to the external diameter of the plug part or of the plug-type connection arrangement. Nevertheless, a sufficiently high strength can be realized.

The strength can be increased again if the two layers are connected to one another by an adhesive force connection. A solder connection in particular can be used for this purpose. A solder connection of this type can be embodied or formed, for example, by a reflow method during production. The solder can be applied, for example, using a solder cladding.

It is useful to provide at least one attachment area for connecting the plug part to a hose, a pipe or a flat surface. For connection to a flat surface, for example, a collar-like flange can be provided on one end of the plug part. Outer surfaces in the manner of a fir-tree are also conceivable for placing a hose.

It may be advantageous if the plug part has barb-like projections, in particular, projections that have only a slight width extension (e.g., up to 1, 2 or 3 mm). The barb-like projections can penetrate in particular into an elastic hose or an elastic pipe surface and effectively prevent the hose or the pipe from being drawn off the plug part. The barb-like projections can be realized in particular by a bending of certain areas of the surface of the plug part inwards or outwards into the pipe or hose surface corresponding thereto.

Moreover, according to embodiments of the invention, a plug-type connection arrangement for connecting two fluid lines includes the above-described plug part and a coupling part, and the arrangement can be further developed according to one of the described possibilities for further development. A corresponding plug-type connection arrangement exhibits the properties and advantages already mentioned in an analogous manner. The modification possibilities already described can also be applied in a modified form to the plug-type connection arrangement.

It is possible in particular for the plug part and the coupling part to be locked to one another with the aid of a locking element. A particularly simple assembly can be realized thereby, such that the plug-type connection arrangement optionally can be released again in a particularly simple manner.

In particular, a spring ring with flange areas bent inwards can be provided as a locking element. The flange areas can engage in the annular groove/grooves that is/are embodied or formed in the plug part and/or in the coupling part. Due to its elastic properties, the spring ring can be elastically bent and the flange areas thereof can snap into the annular grooves of the plug part and/or the coupling part.

Advantageously, the spring ring can be provided with handling areas. With the aid of handling areas of this type, the spring ring can be bent up in a particularly simple manner, for example, by hand or with the aid of a suitable tool. As handling areas, for example, projections can be provided on the spring ring or two holes into which the corresponding ends of suitable pliers can be inserted.

It is possible to embody or form the coupling part of the plug-type connection arrangement in the manner of a sleeve, in particular a metal sleeve. A particularly light and stable embodiment can thus be promoted on the entire plug-type connection arrangement analogously to the plug part.

Analogously to the plug part, it is also possible to deep draw the coupling part.

Furthermore, it is useful if the coupling part also has an annular groove area. The locking element, such as in particular a spring ring provided with flanges bent inwards, can engage into this annular groove area in order to lock the plug part and the coupling part of the plug-type connection arrangement to one another.

If the annular groove area of the coupling part is arranged on the front face (relative to the coupling part), the annular groove area can be provided before the pipe or hose end when seen in the axial direction. This makes it possible for the plug-type connection arrangement not to project or to project only a little beyond the radial dimensions of the hose or of the pipe. A particularly compact design of the finished plug connection arrangement is thereby possible.

Furthermore, it has proven to be advantageous if the annular groove area of the coupling part is embodied or formed by a bent over area of a preferably two-layer area of the coupling part. In this manner, the ring can be embodied or formed by a simple deformation step. Thus, for example, no material-removing methods are necessary. A particularly high stability of the arrangement is possible using the two-layer embodiment optionally present.

To increase the tightness, at least one sealing ring can be provided between the coupling part and the plug part.

Advantageously, the coupling part (analogously to the plug part) is also provided with a connection area for connection to a pipe, a hose and/or to a flat surface.

Likewise analogously to the plug part, it is also useful to provide the coupling part by barb-like projections in the connection area.

According to embodiments of the invention, a plug part of a plug-type connection arrangement for connecting two fluid lines includes at least one two-layer area, the two layers of the two-layer area including a metallic material. At least a portion of the plug part is structured and arranged to be fed into a coupling part of the plug-type connection arrangement.

In accordance with a feature of the invention, at least one of the two layers can be made of a metallic material.

According to another feature of the invention, the metallic material may be a sheet metal.

According to still another feature, the plug part may be formed at least in part by being deep drawn.

In accordance with another feature of the invention, the two layers of the two-layer area can be connected to one another in one piece.

According to a further feature of the invention, the two layers can essentially completely include a metallic material.

Further, an extended insert area may be structured and arranged for insertion into the coupling part.

In accordance with another feature of the invention, a front area can have a tapering feed region structured and arranged to be fed into the coupling part.

Still further, an annular groove may be structured and arranged to engage with a locking element, the locking element being structured and arranged to form a locking connection of the plug part and the coupling part. An inclined contact surface can lead to the annular groove. Further, radial projections may be structured and arranged at least in some areas to have a greater external radius than corresponds to the largest external radius of the inclined contact surface. Moreover, the two layers of the two-layer area can be spaced apart from one another in at least some areas. The at least some areas may include at least one of an area of a pipe connection region for receiving a pipe or hose and an area of the annular groove. Further still, the two layers may be in contact with one another in at least some areas. The at least some areas can include an area of an insert region for insertion into the coupling part and an area of the annular groove.

Further, the two layers can be connected by a positive connection. The positive connection may include a solder connection, and the solder connection can be formed by at least one of a solder cladding and a reflow method.

In accordance with another feature of the invention, an attachment area can be structured and arranged to receive at least one of a hose, pipe or flat surface. The attachment area can include barb-like projections.

According to embodiments of the invention, a plug-type connection arrangement for connecting two fluid lines includes a plug part, as described above, and a coupling part.

In accordance with a feature of the invention, a locking element is included. The plug part and the coupling part can be lockable to one another with the locking element. The locking element may include a spring ring with flange areas bent inwards. Further, the spring ring may have handling areas.

According to another feature of the invention, the coupling part can include a sleeve, and the sleeve may be a metal sleeve.

In accordance with a feature of the invention, the coupling part can is deep drawn.

Further, the coupling part can have an annular groove area. The annular groove area of the coupling part may be positionable on the front face, and the annular groove area of the coupling part can include a bent over area. Further, the annular groove area of the coupling part can include a two-layer area of the coupling part.

In accordance with another feature, at least one sealing ring may be arranged between the coupling part and the plug part.

According to still another feature of the invention, the coupling part may have a connection area structured and arranged for connection with at least one of a pipe, a hose and a flat surface.

In accordance with still yet another feature of the invention, the connection area can include barb-like projections.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
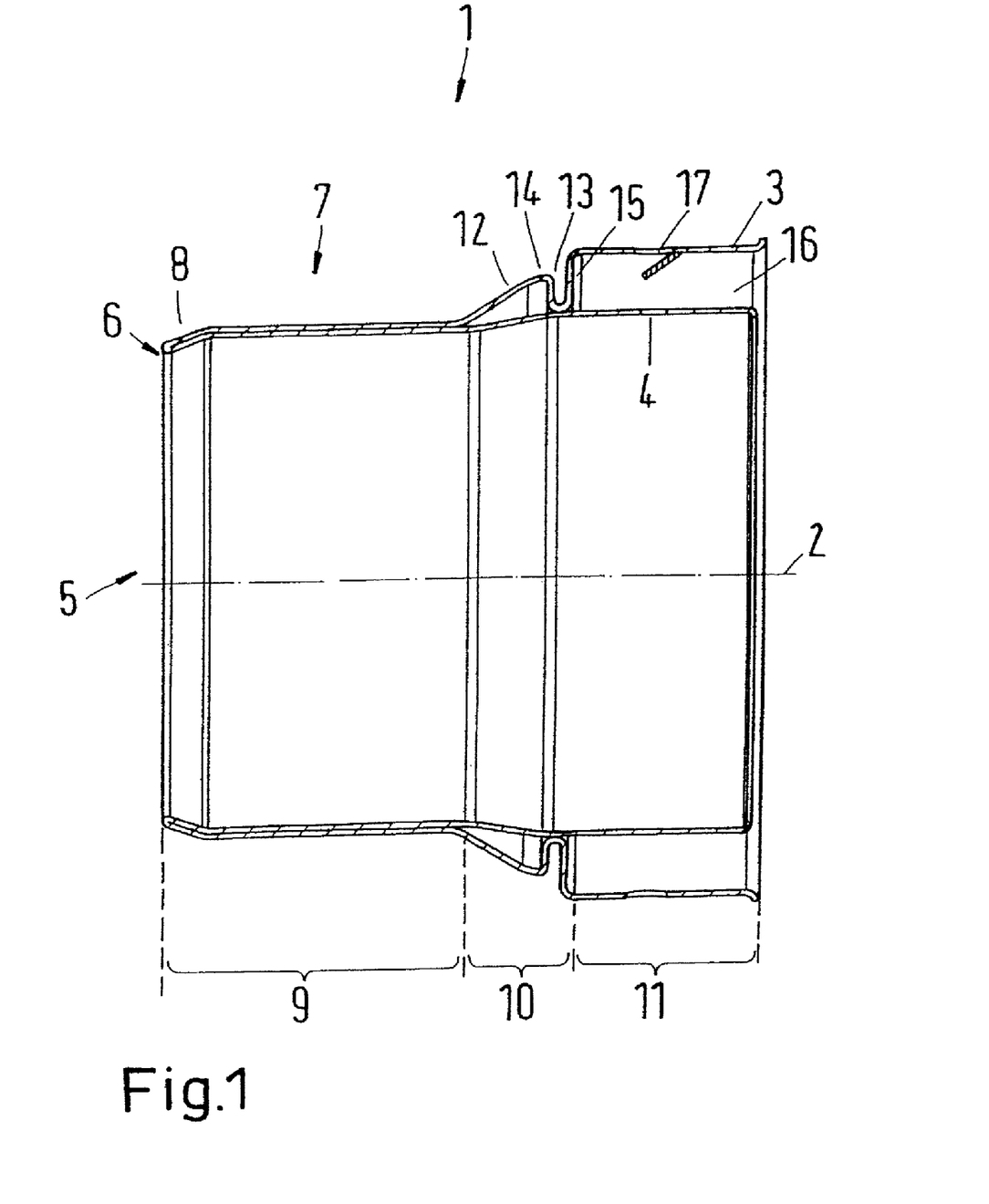
FIG. 1 illustrates a deep-drawn, double-walled fluid plug comprising sheet metal in a diagrammatic cross-sectional view.
Figure 4:
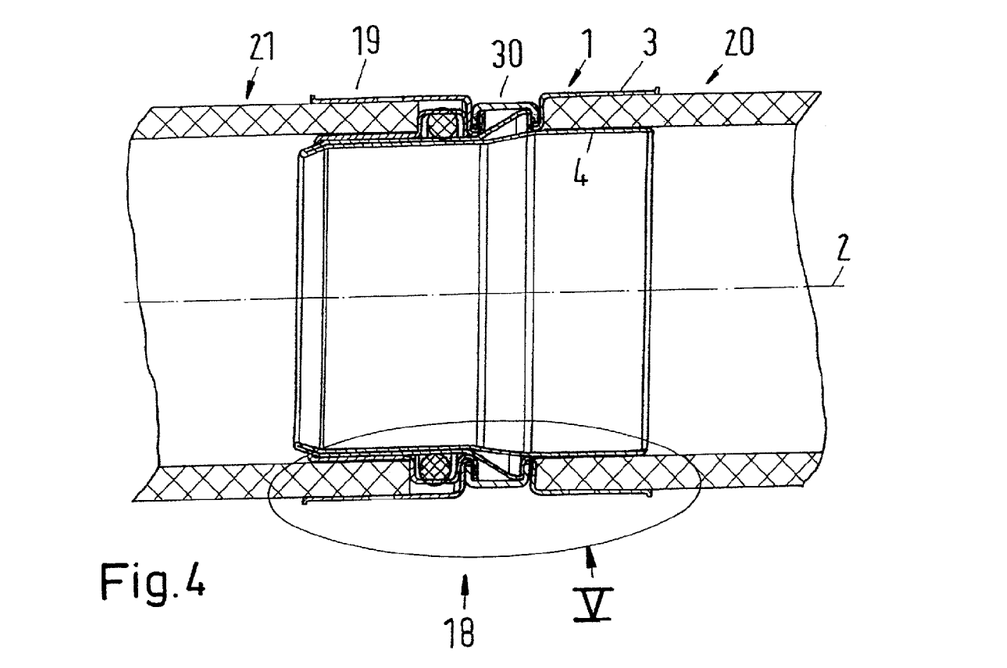
FIG. 4 illustrates a locked fluid plug connection using the fluid plug shown in FIG. 1 in diagrammatic cross-section.
Figure 6:
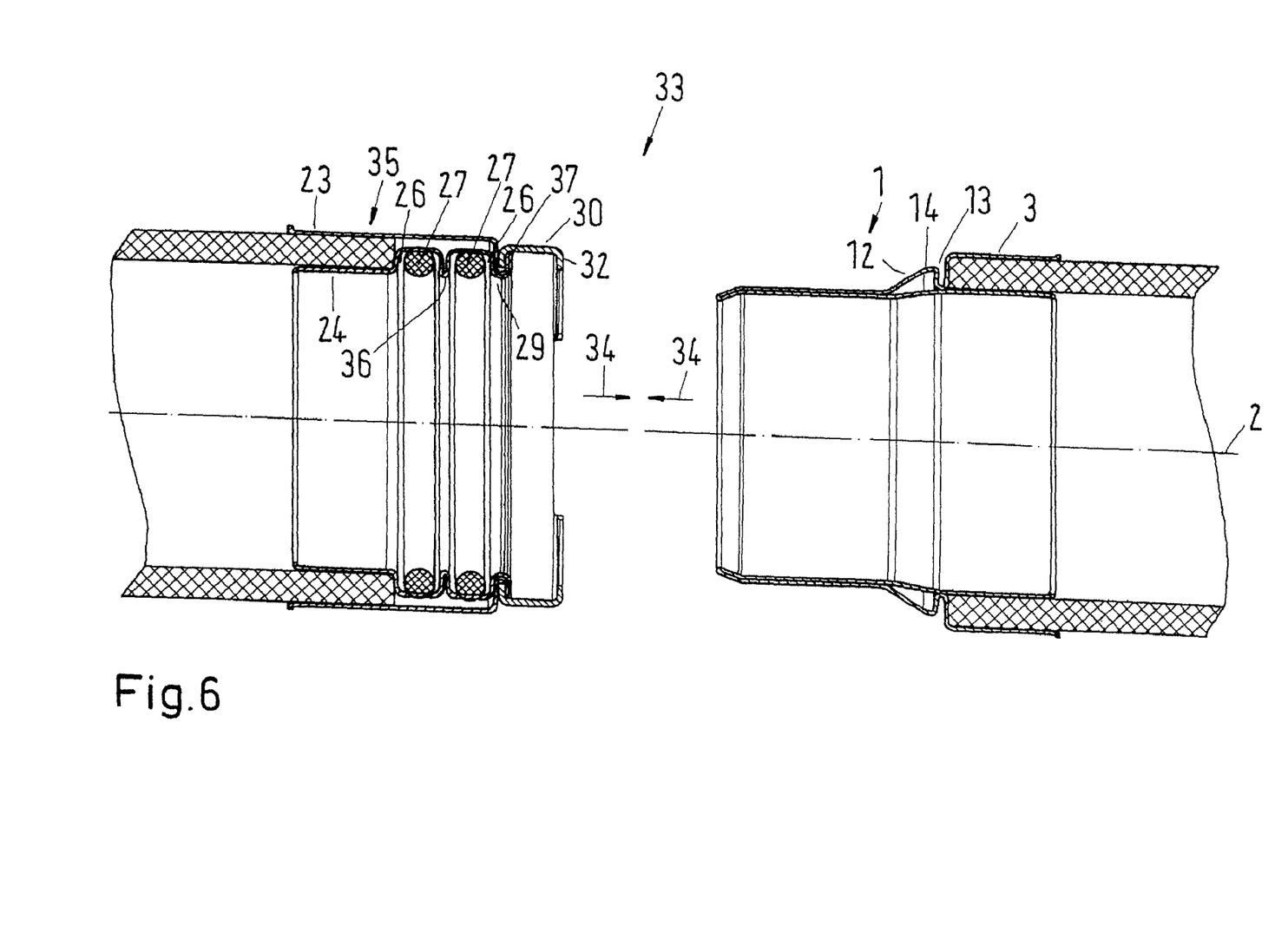
FIG. 6 illustrates a second possible design of a fluid plug connection using the fluid plug shown in FIG. 1.

FIG. 1 shows in cross section a possible design for a fluid plug 1, which can be used for embodying a self-locking fluid plug connection (see FIGS. 4 and 6). The fluid plug is embodied in an essentially radially symmetrical manner around its center axis 2.

Fluid plug 1 has thin walls (sleeves) 3 and 4 of a metal such as, for example, iron, steel, another iron alloy, aluminum or an aluminum alloy. In accordance with embodiments of the invention, fluid plug 1 is produced through a deep-draw process from a metal piece, a so-called blank. The blank is thereby deep-drawn in several stages, wherein interior wall 4 is produced by an inside-out redrawing. Deep-drawing methods are described, for example, in German Application No. DE 196 54 364 B4 or DE 31 23 606 A1. Exterior wall 3 and interior wall 4 are thus connected to one another in one piece in an area of a front face 5 of fluid plug 1 in the form of a bent over lip 6. Further, according to embodiments of the invention, exterior wall 3 and interior wall 4 are connected to one another in a fixed manner, and no fluid can penetrate into the area lying between exterior wall 3 and interior wall 4 in the area of front face 5.

In its end facing towards front face 5, fluid plug 1 has an insert sleeve 7 that can be inserted into a holding area of a fluid coupling 19 (see FIG. 4) and/or 35 (see FIG. 6) corresponding thereto. A conically tapering feed region 8 is provided on its front side facing towards front face 5 of fluid plug 1. Feed region 8 is embodied or formed by radially bending over inwards insert sleeve 7. Due to a conical taper of feed region 8, fluid plug 1 does not need to be applied as precisely when it is to be inserted into corresponding fluid coupling 19 and/or 35. Thus, this facilitates the assembly process.

As can be seen from FIG. 1, interior wall 4 and exterior wall 3 (or interior sleeve and exterior sleeve) are directly adjacent to one another in the area of insert sleeve 7 and feed region 8. In the exemplary embodiment shown in FIG. 1, no connection measures such as adhesion, soldering etc. are provided between interior wall 4 and exterior wall 3 (apart from lip region 6). To increase the strength, however, it is just as conceivable here to solder exterior wall 3 and interior wall 4 to one another for example using a reflow method.

Insert sleeve 7 and feed region 8 together form insert region 9 that with a locked fluid plug connection 18 (see FIG. 4) and/or 33 (see FIG. 6) is located essentially completely inside corresponding fluid coupling 19 and/or 35 or pipe end or hose end 21 provided with fluid coupling 19 and/or 35.

Locking region 10 is provided adjacent to insert region 9. In this locking region 10, exterior wall 3 is bent conically outwards with respect to center axis 2, so that an inclined contact surface 12 results for a locking element 300. In the assembly of fluid plug 1 with a fluid coupling 19 and/or 35, the locking element 300 can be formed, e.g., by a spring ring 30 provided with flanges 31 and 32 bent inwards to slide over inclined contact surface 12 and thereby radially expand flanges 31 and 32 and spring ring 30. As soon as flanges 31 and 32 of spring ring 30 have passed beyond lug 14 of inclined contact surface 12, they snap in under the spring force of spring ring 30 into annular groove 13 of fluid plug 1 and lock fluid plug 1 and coupling 19 or 35 to one another. As can be seen from FIG. 1, the outer radius of exterior wall 3 is greater in a pipe connection region 11 than the radius of lug 14, thereby forming a stop face 15 for spring ring 30. In this manner, spring ring 30 cannot slide into an area located behind annular groove 13.

As can be further seen from FIG. 1, in the present exemplary embodiment, interior wall 4 of fluid plug 1 in locking region 10 is also embodied or formed in a conically flared manner, albeit at an angle smaller than the angle of contact surface 12 in exterior wall 3. However, it is likewise possible for interior wall 4 to continue to run cylindrically without flaring (see FIG. 3). Through the conical flaring of inner sleeve 4, it is achieved in the exemplary embodiment shown in FIG. 1 that interior wall 4 comes into contact with exterior wall 3 in the area of annular groove 13. It is possible thereby to provide a simple mechanical contact without further connection measures, or also connection measures such as, for example, a soldered connection or an adhesive connection. A closure by adhesive force, for example, is also possible.

Finally, a pipe connection area 11 is also provided adjoining locking area 10. Pipe connection area 11 is here embodied or formed in a sleeve-like manner. To that end, interior wall 3 and exterior wall 4 have a spacing that corresponds approximately to a thickness of hose or pipe 20 to be connected to fluid plug 1. Hose end or pipe end 20 can thus be inserted in an accurately fitting manner into holding area 16 formed by interior wall 4 and exterior wall 3. For connection between pipe/hose 20 and fluid plug 1, for example, an adhesive or a non-positive connection can be provided between walls 3 and 4 and pipe or hose 20. In addition, a barb 17 is provided at regular intervals in a radial direction along exterior wall 3 in the area of pipe connection area 11 of fluid plug 1. Barb 17 can be embodied or formed in exterior wall 3, e.g., by forming a U-shaped slot (for example, through a punching operation). The tongue produced thereby can be bent inwards such that the barb 17 that can be seen in FIG. 1 is formed. Of course, it is possible alternatively or additionally to embody the tongue-like barb 17 with the aid of the interior wall 4. In any case, a particularly firm seat of the pipe or of the hose 20 in the holding area of the fluid plug can be achieved through the barb 17.

Figure 2:
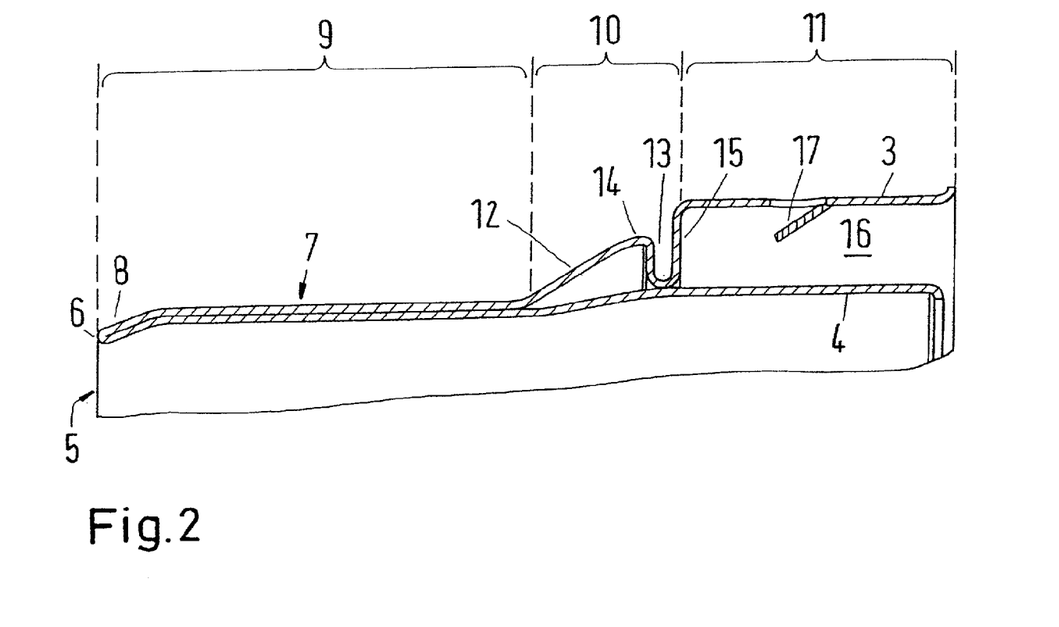
FIG. 2 illustrates a detailed section of the fluid plug shown in FIG. 1 in cross section.

In FIG. 2 the corresponding ratios are shown again in an enlarged cross-sectional view. Preferably, the spacing between the exterior wall 3 in the pipe connection area 11 and the lug 14 of the inclined contact surface 12 in the radial direction is selected such that the difference essentially corresponds to or is smaller than the thickness of the spring ring used for locking. Thus, an essentially flush outer surface 4 (at least an outer surface that does not project outwards) of the plug-type connection arrangement can be realized.

Figure 3:
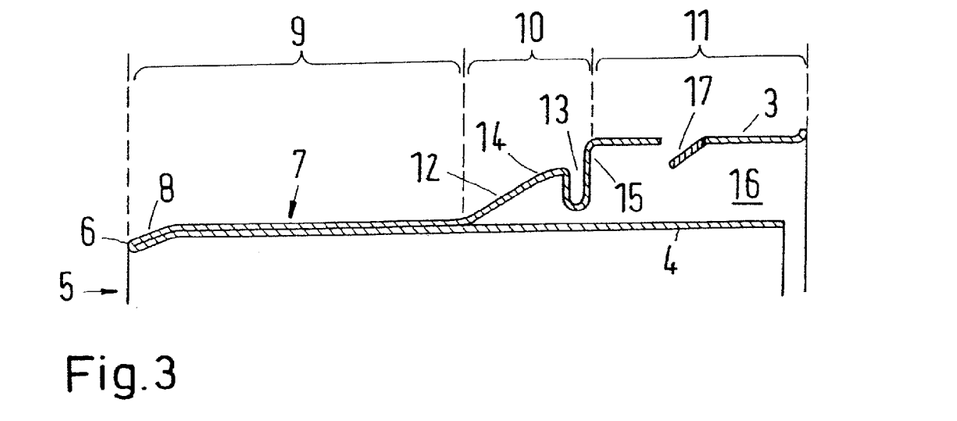
FIG. 3 illustrates an exemplary embodiment of a fluid plug in a sectional cross-sectional view modified with respect to FIG. 2.

FIG. 3 shows an embodiment of a fluid plug 1 that is slightly modified with respect to FIG. 2. The area of fluid plug 1 corresponding to FIG. 2 is thereby shown. As can be clearly seen in FIG. 3, interior wall 4 of fluid plug 1 shown there also runs in a straight cylindrical manner in locking area 10. Interior wall 3 and exterior wall 4 in the area of annular groove 13 are thus embodied or formed spaced apart from one another. Of course it is also possible for annular groove 13 to be embodied or formed deeper so that a contact between exterior wall 3 and interior wall 4 of fluid plug 1 also occurs here.

FIG. 4 shows an assembled plug-type connection arrangement 18 using fluid plug 1 shown in FIG. 1. Plug-type connection arrangement 18 is used to connect two hoses 20 and 21, of which only hose ends 20 and 21 can be seen here. The area indicated in FIG. 4 and labeled by V is shown enlarged in FIG. 5 to clarify the relationships.

Figure 5:
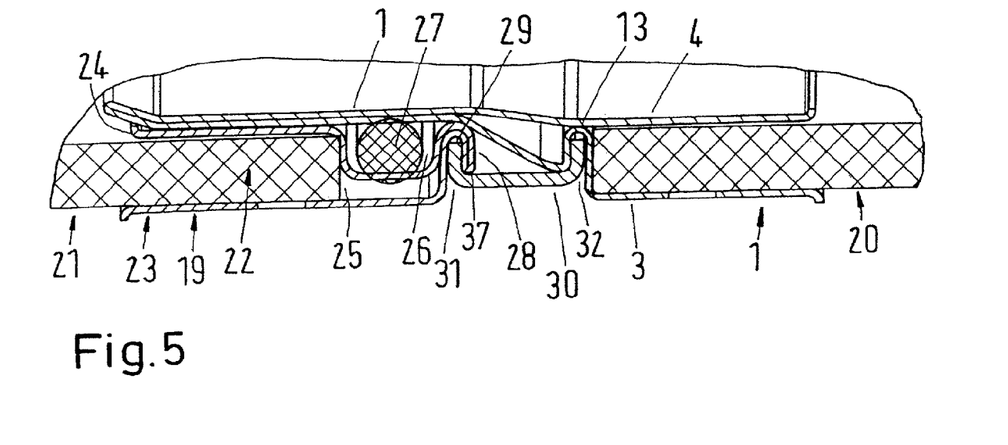
FIG. 5 illustrates a detail section of the fluid plug connection shown in FIG. 4.

In the exemplary embodiment shown in FIGS. 4 and 5, fluid coupling 19 is also produced from a metal piece by deep drawing. With fluid coupling 19 (analogously to fluid plug 1), hose end 21 is also accommodated by a holding area 22, that is formed by a correspondingly spaced exterior wall 23 and interior wall 24 of the fluid coupling in this area. Upstream of front face 25 of hose end 21, interior wall 24 of fluid coupling 19 is widened in a groove-like manner, so that fluid coupling 19 forms a holding area 26 for a sealing ring 27. Sealing ring 27 is in sealing contact with interior wall 24 of fluid coupling 19 and exterior wall 3 of fluid plug 1.

Walls 23, 24 of the fluid coupling 19 are bent in a U-shaped manner 28 in front of holding area 26 for sealing ring 27 such that an annular groove 29 is formed in the area of the front face of fluid coupling 19. Spring ring 30 is used for the locking connection of fluid plug 1 and fluid coupling 19. On its two axial ends, spring ring 30 has respectively a flange 31 and 32 angled at approximately 90°. In the locked engagement position of plug-type connection arrangement 18 shown in FIGS. 4 and 5, flange areas 31 and 32 of spring ring 30 engage in annular grooves 13 and 29 of fluid plug 1 or of fluid coupling 19.

The spring ring 30 surrounds the connection area, for example, in an angular range of 350° or 355°. In the area of the opening of spring ring 30 thus available, spring ring 30 can be bent out radially outwards. In order to facilitate this bending operation, spring ring 30 can be formed without flanges 31, 32 in partial areas. These partial areas form a type of film hinge of spring ring 30. Furthermore handling areas such as, for example, holes for the engagement of corresponding pliers, can be provided in spring ring 30 adjacent to the opening of spring ring 30.

FIG. 6 shows an exemplary embodiment of a plug-type connection arrangement 33 slightly modified with respect to FIG. 4. Plug-type connection arrangement 33 again uses fluid plug 1 shown in FIG. 1. Deviating from the exemplary embodiment shown in FIG. 4, fluid coupling 35 is slightly modified in the example shown in FIG. 6. As can be easily seen from the exemplary embodiment of FIG. 6, fluid coupling 35 has two sealing rings 27. A higher sealing effect can thus be achieved between fluid plug 1 and fluid coupling 35. To ensure sealing rings 27 remain in their respective holding areas, a projection 36 of interior wall 24 of fluid coupling 33 pointing radially inwards is provided between the two holding areas.

As indicated by arrows 34 in FIG. 6, plug-type connection arrangement 33 is locked together in that fluid plug 1 and fluid coupling 33 are moved axially toward one another. Spring ring 30 is thereby already placed in a preassembly position into annular groove 29 of fluid coupling 35. Fluid coupling 35 and spring ring 30 thus form a preassembled assembly.

If fluid plug 1 and fluid coupling 35 are moved toward one another, at a certain point flange area 32 of spring ring 30 comes into contact with inclined contact surface 12 of fluid plug 1. If fluid coupling 35 and fluid plug 1 are pushed further towards one another, flange 32 slides along inclined contact surface 12 and thereby widens spring ring 30. As soon as flange 32 has passed beyond lug 14 of inclined contact surface 12, under the spring action of spring ring 30, flange 32 snaps into the annular groove 13 of the fluid plug, while flange 31 snaps into annular groove 29 of fluid coupling 35. In this manner, fluid plug 1 and fluid coupling 35 are locked to form the plug-type connection arrangement 33. The radii of lugs 14 and 37 of annular grooves 13 and 29 and the outer radii of exterior walls 3 and 23 in the respective connection areas with hose ends 20 and 21 are selected such that flanges 31 and 32 of spring ring 30 during assembly of plug-type connection arrangement 33 cannot reach areas that lie behind radial grooves 13 and 29. The same also applies analogously to the other exemplary embodiments.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A plug part of a plug-type connection arrangement for connecting two fluid lines, comprising:
    an insert region including at least one two-layer area, the two layers of the two-layer area including a metallic material; and
    an attachment area located radially outside of the insert region that is structured and arranged to be couplable to at least one of a hose, pipe or flat surface; and
    an annular groove structured and arranged to engage with a locking element, the locking element being structured and arranged to form a locking connection of the plug part and the coupling part,
    wherein the insert region is structured and arranged to be fed into a coupling part of the plug-type connection arrangement.

2. The plug part in accordance with claim 1, wherein at least one of the two layers is made of a metallic material.

3. The plug part in accordance with claim 1, wherein the metallic material is a sheet metal.

4. The plug part in accordance with claim 1, wherein the plug part is formed at least in part by being deep drawn.

5. The plug part in accordance with claim 1, wherein the two layers of the two-layer area are connected to one another in one piece.

6. The plug part in accordance with claim 1, wherein the two layers essentially completely comprise a metallic material.

7. The plug part in accordance with claim 1, further comprising an inclined contact surface that leads to the annular groove.

8. The plug part in accordance with claim 1, further comprising radial projections structured and arranged at least in some areas have a greater external radius than corresponds to the largest external radius of the inclined contact surface.

9. The plug part in accordance with claim 1, wherein the two layers of the two-layer area are spaced apart from one another in at least some areas.

10. The plug part in accordance with claim 9, wherein the at least some areas include the attachment area and an area of the annular groove.

11. The plug part in accordance with claim 1, wherein the two layers are in contact with one another in at least some areas.

12. The plug part in accordance with claim 11, wherein the at least some areas comprise an area of an insert region for insertion into the coupling part and an area of the annular groove.

13. The plug part in accordance with claim 1, wherein the two layers are connected by a positive connection.

14. The plug part in accordance with claim 13, wherein the positive connection comprises a solder connection.

15. The plug part in accordance with claim 14, wherein the solder connection is formed by at least one of a solder cladding and a reflow method.

16. A plug-type connection arrangement for connecting two fluid lines, comprising a plug part in accordance with claim 1 and a coupling part.

17. The plug-type connection arrangement in accordance with claim 16, further comprising a locking element,
    wherein the plug part and the coupling part are lockable to one another with the locking element.

18. The plug-type connection arrangement in accordance with claim 17, wherein the locking element comprises a spring ring with flange areas bent inwards.

19. The plug-type connection arrangement in accordance with claim 18, wherein the spring ring has handling areas.

20. The plug-type connection arrangement in accordance with claim 16, wherein the coupling part comprises a sleeve.

21. The plug-type connection arrangement in accordance with claim 20, wherein the sleeve is a metal sleeve.

22. The plug-type connection arrangement in accordance with claim 16, wherein the coupling part is deep drawn.

23. The plug-type connection arrangement in accordance with claim 16, further comprising at least one sealing ring arranged between the coupling part and the plug part.

24. The plug-type connection arrangement in accordance with claim 16, wherein the coupling part has a connection area structured and arranged for connection with at least one of a pipe, a hose and a flat surface.

25. The plug-type connection arrangement in accordance with claim 24, wherein the connection area comprises barb-like projections.

26. The plug part in accordance with claim 1, wherein an inner diameter of the attachment area is located radially outside of an outer diameter of the insert region.

27. A plug part of a plug-type connection arrangement for connecting two fluid lines comprising:
   an insert region including at least one two-layer area, the two layers of the two-layer area including a metallic material; and
   an attachment area located radially outside of the insert region that is structured and arranged to be couplable to at least one of a hose, pipe or flat surface,
   wherein the insert region is structured and arranged to be fed into a coupling part of the plug-type connection arrangement and wherein the insert region comprises an extended insert area and a beveled feed region that comprise a two layer structure for insertion into the coupling part.

28. The plug part in accordance with claim 1, the insert region further comprising a front area having a tapering feed region structured and arranged to be fed into the coupling part.

29. A plug part of a plug-type connection arrangement for connecting two fluid lines, comprising:
   an insert region including at least one two-layer area, the two layers of the two-layer area including a metallic material; and
   an attachment area located radially outside of the insert region that is structured and arranged to be couplable to at least one of a hose, pipe or flat surface,
   wherein the insert region is structured and arranged to be fed into a coupling part of the plug-type connection arrangement, and
   barb-like projections extend into said attachment area.

30. A plug-type connection arrangement for connecting two fluid lines, comprising:
   a plug part including:
      an insert region including at least one two-layer area, the two layers of the two-layer area including a metallic material; and
      an attachment area located radially outside of the insert region that is structured and arranged to be couplable to at least one of a hose, pipe or flat surface,
      wherein the insert region is structured and arranged to be fed into a coupling part of the plug-type connection arrangement; and
   a coupling part,
   wherein the coupling part has an annular groove area.

31. The plug-type connection arrangement in accordance with claim 30, wherein the annular groove area of the coupling part is arranged on a front face of the coupling part.

32. The plug-type connection arrangement in accordance with claim 30, wherein the annular groove area of the coupling part comprises a bent over area.

33. The plug-type connection arrangement in accordance with claim 32, wherein the annular groove area of the coupling part comprises a two-layer area of the coupling part.

* * * * *